UNITED STATES PATENT OFFICE.

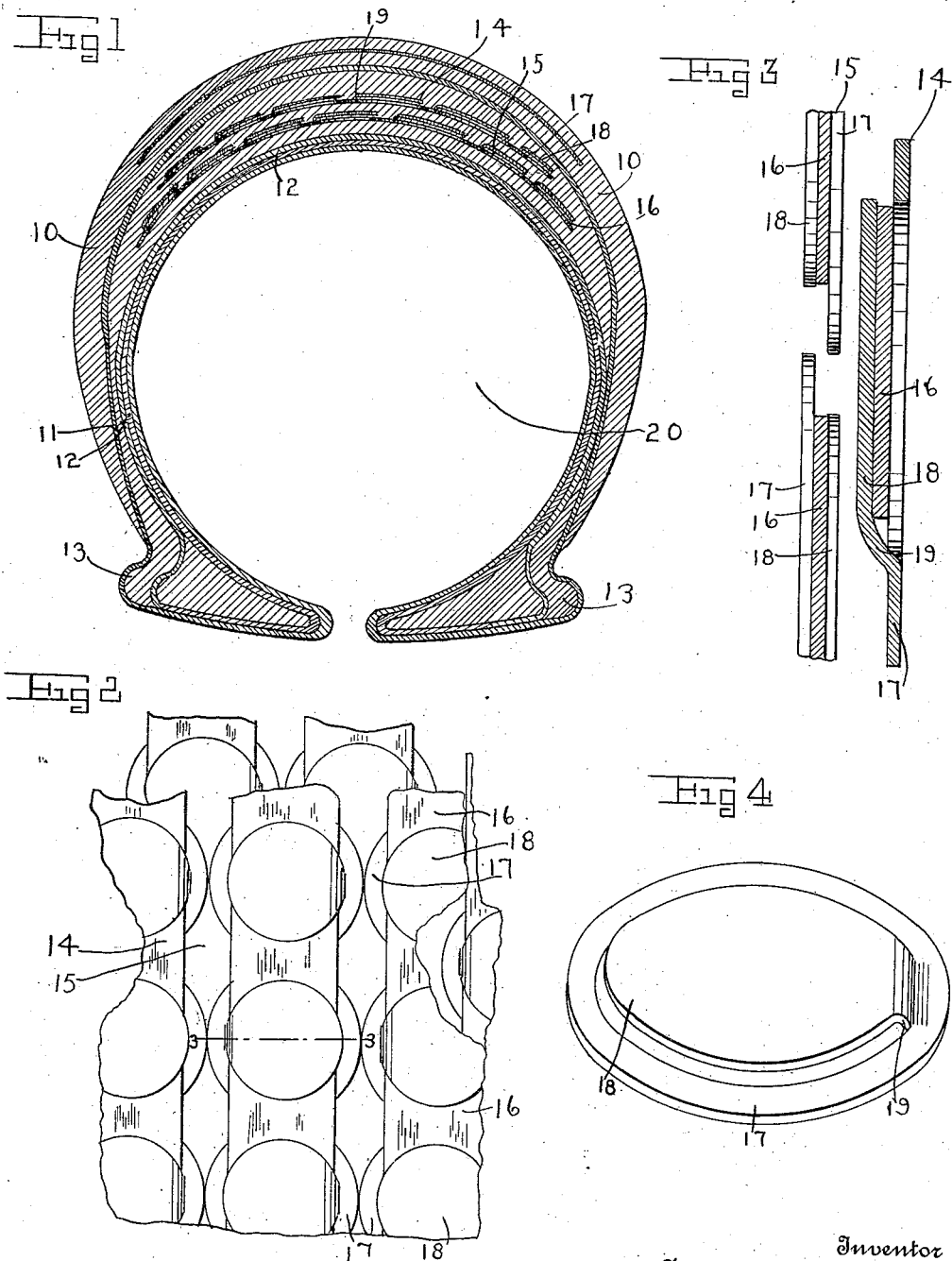

CASSELL DE HIBBS, OF FORT WORTH, TEXAS.

PUNCTURE-PROOF TIRE.

1,057,946.     Specification of Letters Patent.     Patented Apr. 1, 1913.

Application filed September 28, 1911. Serial No. 651,845.

*To all whom it may concern:*

Be it known that I, CASSELL DE HIBBS, a citizen of the United States, residing at Fort Worth, in the county of Tarrant and State of Texas, have invented certain new and useful Improvements in Puncture-Proof Tires, of which the following is a specification.

This invention relates to improvements in tires, and has particular reference to an internal armor therefor.

The principal object of the present invention is to provide an improved armor of the kind described, which may be quickly and easily assembled before being embedded in the tire.

Other objects and advantages will be apparent from the following description, and with particular reference to the accompanying drawings, in which, Figure 1 is a cross sectional view of a tire made in accordance with the preferred form of my invention, Fig. 2 is a plan view of the armor removed from the tire, enlarged, Fig. 3 is a section on the line 3—3 of Fig. 2, Fig. 4 is a perspective view of one of the plates detached.

Referring particularly to the accompanying drawings, which illustrate my invention, it will be seen that the tire is composed of the rubber portion 10, in which are embedded the fabrics 11 and 12, the former of which being disposed near the tread of the tire, and the latter adjacent the inner portion thereof. The tire here represented, is of the "clencher" type, and has the rim engaging portions 13, the centers of which are composed of rubber, and the fabrics 11 and 12 surrounding the same, so that a great amount of elasticity is provided, yet the fabrics protect the rubber portions 13 from wear against the rim.

My armor is embedded in the rubber of the tire between the inner and outer fabrics 11 and 12, and comprises two layers 14 and 15. Each of these layers consists of continuous strips of fabric, or other suitable material 16, which extend around the tire, between the fabrics 11 and 12, as above mentioned. On each of these strips I attach a number of plates 17, which are composed preferably of metal, and may be of any desired size or shape, that shown being circular. From the center of each plate is cut a portion 18, of any shape, but left attached to the plate by a connecting portion 19. This center portion is raised to engage one face of the strip, while the body portion of the plate engages the lower face of the strip. The plates are slipped on the strip, alternately, from opposite sides.

The lower, or inner layer of the armor has one more strip than the upper or outer layer, and the strips are so disposed with relation to each other that the plates of the outer layer cover the spaces between the plates of the inner layer, thus preventing the possibility of any puncturing object entering the air chamber 20 of the tire. When thus arranged the two, (or more layers if desired) present a practically solid impenetrable surface, and effectively prevent puncturing of the tire.

It will, of course, be understood that the number of layers is immaterial, except that there should be at least two, so that the plates of one layer will cover the spaces between the plates of the other layer. Also, the shape of the plates is not to be confined to that shown, the principal object being the fabric strips, and the metal plates so formed that they can be quickly and easily attached or detached.

What is claimed is:

An internal armor for tires comprising a plurality of layers of strips of fabric embedded in the tire, said strips being spaced apart in parallel relation, the strips of one layer being arranged over the spaces between the strips of the other layer, and metallic plates detachably secured to the strips, the plates of one layer of strips being arranged in superposed and staggered relation to the plates of the other layer, said plates consisting each of a body portion, and a partially detached discal central portion, disposed in parallel relation to the body portion of the plate, one of the strips being disposed between the said discal portion and the said body portion.

In testimony whereof I affix my signature, in the presence of two witnesses.

CASSELL DE HIBBS.

Witnesses:
    GEO. W. ROSS,
    G. S. MOSER.